RECORD CHANGING DEVICE

Filed Sept. 30, 1946 6 Sheets-Sheet 1

INVENTOR
HARVEY C. HABEGGER
BY [signature]
ATTORNEY

June 23, 1953 H. C. HABEGGER 2,643,129

RECORD CHANGING DEVICE

Filed Sept. 30, 1946 6 Sheets-Sheet 2

INVENTOR
HARVEY C. HABEGGER

BY [signature]

ATTORNEY

June 23, 1953 H. C. HABEGGER 2,643,129

RECORD CHANGING DEVICE

Filed Sept. 30, 1946 6 Sheets-Sheet 3

INVENTOR
HARVEY C. HABEGGER

BY [signature]

ATTORNEY

June 23, 1953 H. C. HABEGGER 2,643,129

RECORD CHANGING DEVICE

Filed Sept. 30, 1946 6 Sheets-Sheet 4

INVENTOR
HARVEY C. HABEGGER

BY [signature]

ATTORNEY

June 23, 1953 H. C. HABEGGER 2,643,129

RECORD CHANGING DEVICE

Filed Sept. 30, 1946 6 Sheets-Sheet 5

INVENTOR
HARVEY C. HABEGGER

BY

ATTORNEY

June 23, 1953 H. C. HABEGGER 2,643,129

RECORD CHANGING DEVICE

Filed Sept. 30, 1946 6 Sheets-Sheet 6

INVENTOR
HARVEY C. HABEGGER

BY [signature]

ATTORNEY

Patented June 23, 1953 2,643,129

UNITED STATES PATENT OFFICE 2,643,129

RECORD CHANGING DEVICE

Harvey C. Habegger, Fort Wayne, Ind., assignor, by mesne assignments, to Farnsworth Research Corporation, a corporation of Indiana Application September 30, 1946, Serial No. 700,246

13 Claims. (Cl. 274—10)

This invention relates generally to automatic phonographs and more particularly it relates to automatic phonographs of the drop type which are adapted to handle records of different diameters in intermixed relation.

Conventional automatic phonographs of the drop type are provided with three different types of record supporting mechanism. For example, it is conventional to utilize two diametrically opposite record supports for supporting a stack of records above the turntable. These record supports may consist of rotatable knives or fixed shelves having sliding members for removing records therefrom. Another type of record support consists of a shelf at one side of the turntable which is adapted to cooperate with a spindle having a notched portion for supporting a stack of records above the turntable. Records may be removed from this type of support by means of a mechanism adapted to slide the lowermost record from the supports to the turntable. As is well-known to those skilled in the art, it is not possible to use records of different diameters in intermixed relation with record changers having record supports such as those described in the foregoing, the reason being that it is very difficult to release records to the turntable unless all of the records in the stack are of the same diameter.

A third type of record supporting mechanism comprises a spindle which is centered with respect to the turntable and which is provided with a record supporting and releasing mechanism which is more or less self-contained within the spindle. For example, it is conventional to provide a rotatable record releasing member which is eccentrically disposed with respect to the remainder of the spindle. By rotating the eccentric member into alignment with the spindle, one record at a time may be released to the turntable. This type of record supporting and releasing mechanism has the disadvantage that it enlarges the centering aperture of the record and this, of course, makes it difficult to insure that the record is centered with reasonable accuracy on the turntable. When records are not centered on the turntable, an audible distortion is produced when the record is played. It is also characteristic of this type of record supporting and releasing mechanism that the stack of records must be supported on a very small area of the lowermost record adjacent its centering aperture. Because of the fact that the complete stack of records may drop onto this limited area of the lowermost record during a record changing cycle, it frequently happens that the record is broken or otherwise mutilated.

In all of the different types of record supporting mechanisms described herein, it is recognized that a certain amount of difficulty is encountered in removing records from the turntable. For example, where diametrically opposite record supports are utilized, it is necessary that the supports be moved with respect to the turntable before removing records from the turntable. In the case of the record supporting mechanism comprising a spindle, it is frequently necessary that only one record be removed at a time from the turntable. In some types of spindle supports, it is possible to make an adjustment which will permit removal of the entire stack of records after playing of the records. Thus, it is evident that a great many prior art record supporting mechanisms have the disadvantage that some adjustment is required before the records may be removed from the turntable.

Another difficulty to be overcome in the prior art record changers described herein is that pertaining to the position of the pickup arm after the last record has been played. It is usually necessary to move the tone arm manually from the last record which has been played before any of the records may be removed from the turntable. Experience shows that many operators of automatic phonographs attempt to remove the played records from the turntable without first swinging the tone arm beyond the periphery of the records, thereby damaging the pickup arm or its associated control mechanism. Damage also occurs when the pickup arm is manually swung outwardly from the records either as a result of careless manipulation or as a result of the use of excessive force.

A still further difficulty is encountered in those record changers where the records are supported by the spindle alone in that the stack of records does not rest on the spindle in a plane parallel to the plane of the turntable. For example, it frequently happens that the stack of records assumes a tilted position before and during a change cycle. If this is the case the pickup arm may collide with the stack and cause damage or maladjustment of the pickup arm control mechanism.

Accordingly, it is the principal object of this invention to provide a novel automatic phonograph which is adapted to play automatically records of intermixed diameters, one after the other in succession.

Another object of this invention is to provide, in an automatic phonograph, a novel change cycle control mechanism that is particularly adapted to operate a record supporting and releasing mechanism which is a composite part of a record centering spindle.

A still further object of this invention is to provide, in an automatic phonograph, a novel spindle that is adapted to support a stack of records over the turntable and includes a record supporting mechanism which is adapted to permit the removal of records from the turntable without any manual manipulation of the spindle.

Still another object of this invention is to provide, in an automatic phonograph, a mechanism for so controlling the pickup arm that it automatically assumes a position beyond the periphery of records on the turntable after the last record has been played.

A further object of this invention is to provide, in an automatic phonograph, a means adapted to prevent the stack of records supported on the spindle from tilting with respect to the spindle.

In accordance with this invention, there is provided a spindle for an automatic phonograph which is adapted to support a stack of records and release them successively to the turntable of the phonograph. The spindle comprises a first member extending above the turntable and a record supporting member fixed adjacent the upper end of said member. There is provided a movable shaft for operating said record supporting member to engage the wall of a centering aperture of a record in the stack. There is also provided a plurality of spring members operatively associated with the first mentioned member adjacent the lower surface of the lowermost record in the stack of records. The spring members are normally positioned to project beyond the wall of the centering aperture of the lowermost record for supporting it. For retracting the spring members into alignment with the aperture of the lowermost record, there is provided a movable tubular member within the first member for drawing the spring members within the first member.

In accordance with another feature of this invention there is provided a control mechanism for automatic phonographs comprising a turntable, a record supporting device, a pickup arm, and a movable change cycle control mechanism. This mechanism includes a first control member for moving the pickup arm inwardly and outwardly with respect to a record on the turntable. There is further provided a second control member for holding the pickup arm in its outermost position at the time that the first control member normally would move the pickup arm inwardly toward the record. A first control linkage is operatively associated with the pickup arm and the control members and a means is provided for normally effecting an operative connection between the first control member and the first control linkage. For transferring said operative connection from the first control member to the second control member there is provided a normally inactive second control linkage and this linkage may be controlled by a means operable by a record supporting device when there are no longer any records supported thereon.

A still further feature of this invention comprises a record supporting and dropping structure consisting of a record centering spindle having a record support incorporated therein. For stabilizing records supported on the spindle there is provided a stabilizing device associated with the spindle together with means for influencing the stabilizing device to an extended position.

For a better understanding of the invention, together with other and further objects thereof, reference is made to the following description, taken in connection with the accompanying drawings, and its scope will be pointed out in the appended claims.

Figure 1:
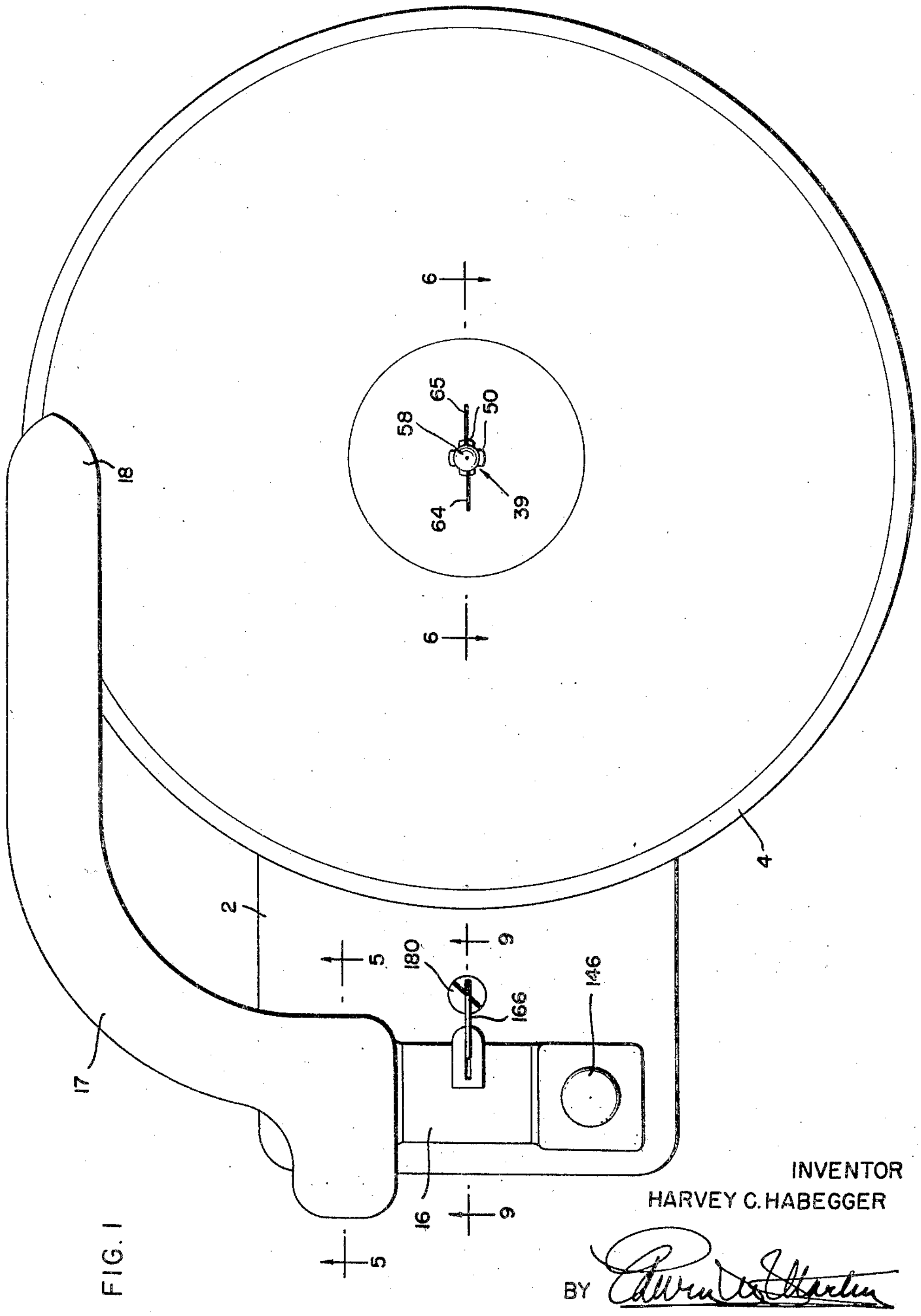
Fig. 1 is a top plan view of the record-changing apparatus with the unplayed records removed from the record supporting means.
Figure 2:
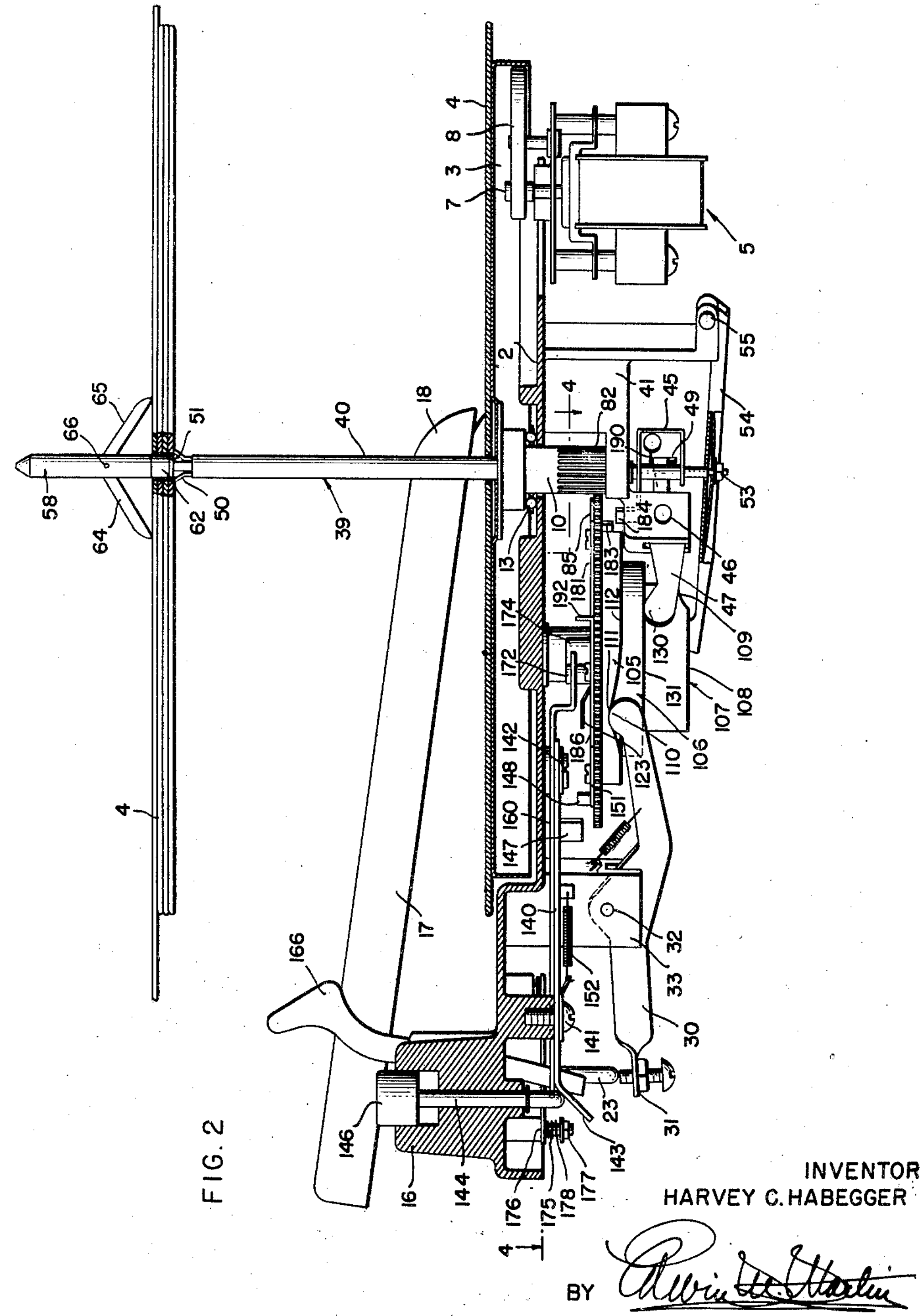
Fig. 2 is a front elevational view of the record changing apparatus.
Figure 12:
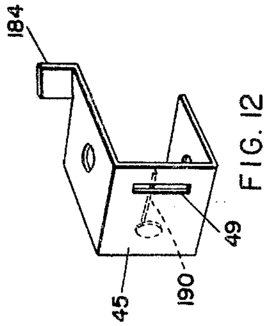
Figures 5, 6, 8, 11:
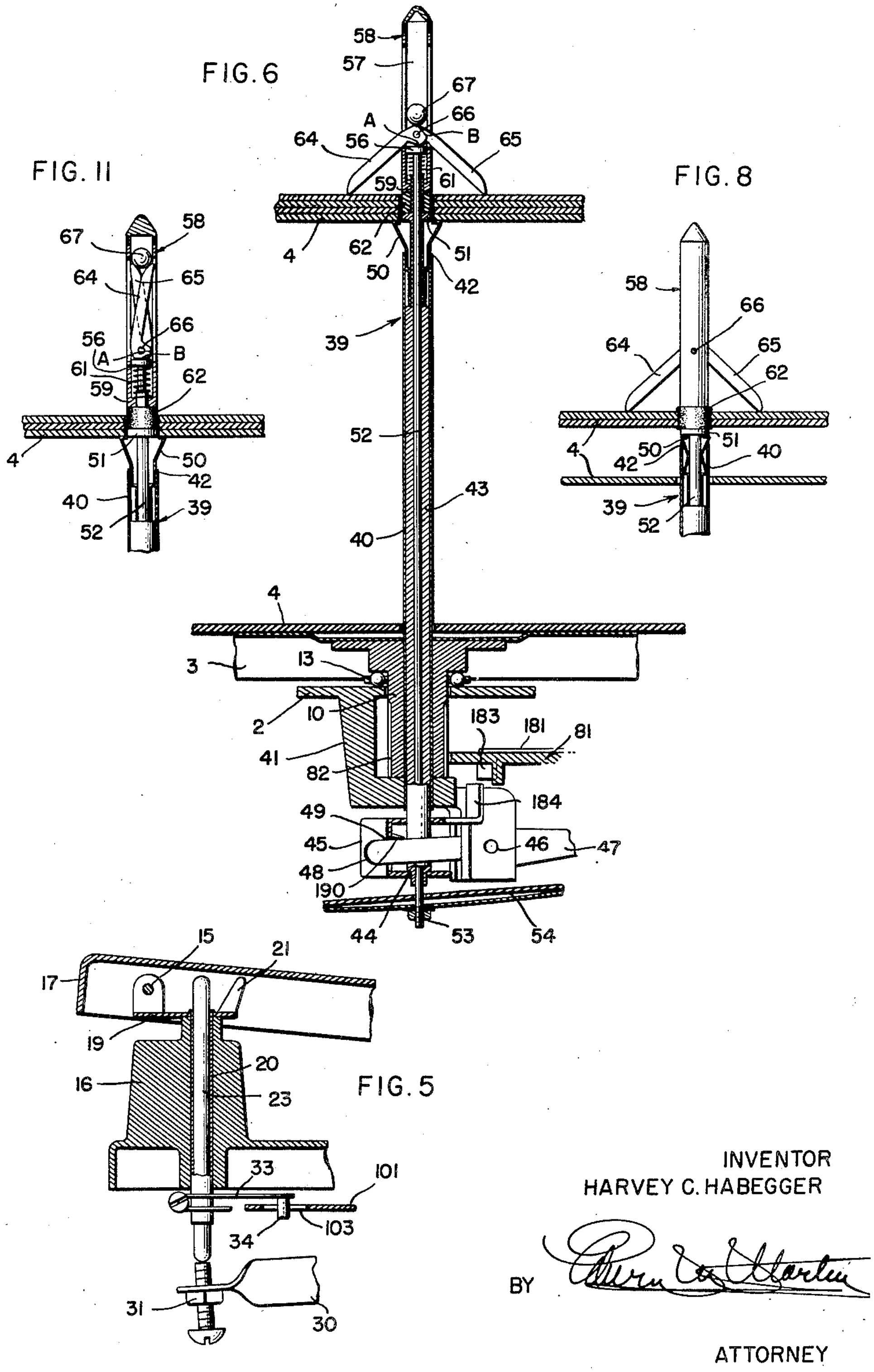
Fig. 5 is a detailed sectional view taken on line 5—5 of Fig. 1 showing the tone arm elevating mechanism.
Fig. 6 is a detailed sectional view taken on line 6—6 of Fig. 1 showing the record supporting and releasing mechanism and illustrating records on the record supporting mechanism.
Fig. 8 illustrates a portion of the operating cycle of the mechanism shown in Figs. 6 and 7.
Figure 7:
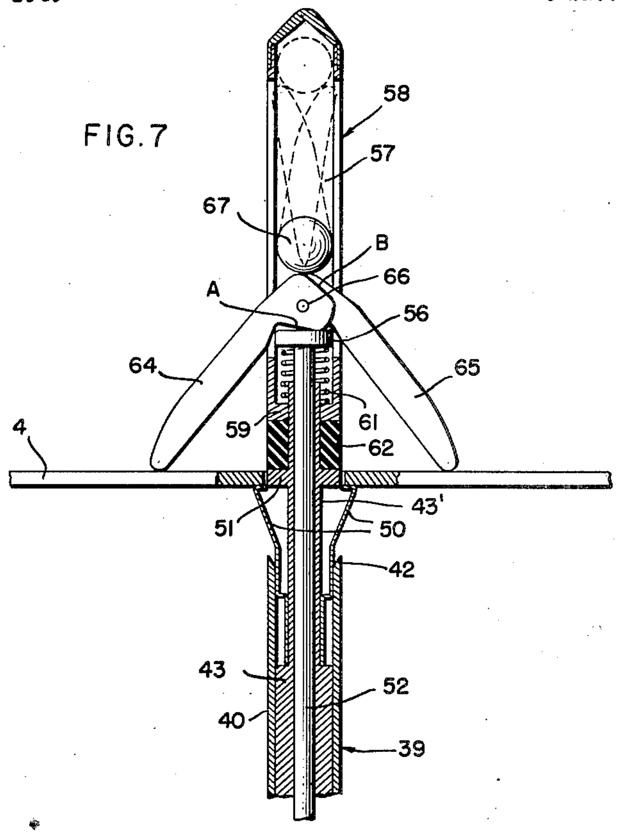
Fig. 7 is an enlarged view of the record supporting means shown in Fig. 6 together with means for stabilizing the unplayed records during the change-cycle.

Fig. 11 illustrates the stabilizing mechanism shown in Figs. 6, 7 and 8 in position to permit removal of records; and Fig. 12 is a perspective view of bracket 45 shown in Figs. 2 and 6.

Figure 3:
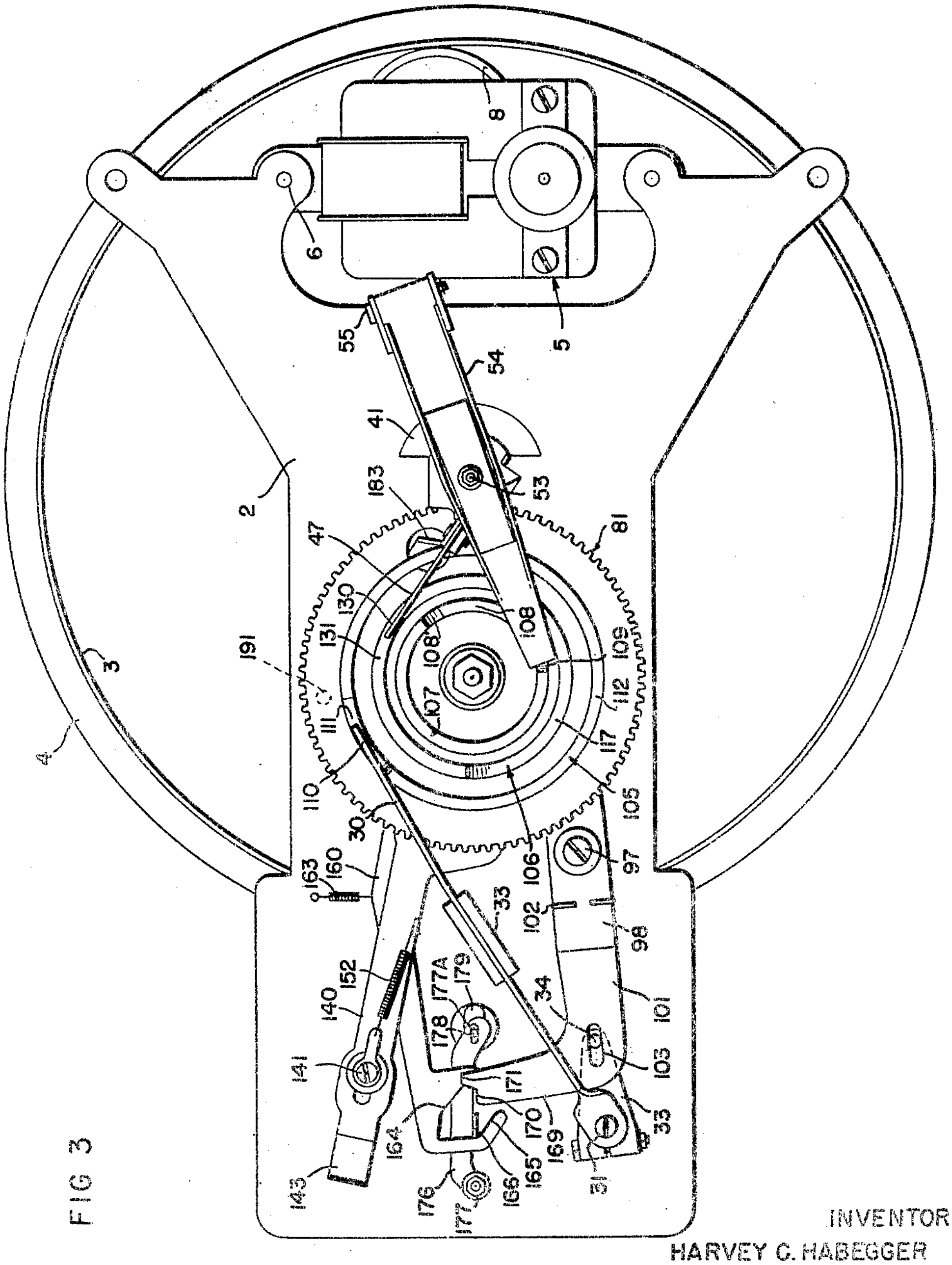
Fig. 3 is a bottom plan view of the apparatus.

Referring generally to the drawings, there is shown a record-changing apparatus consisting of a base plate 2 for supporting a turntable 3 upon which is positioned a record 4 for reproduction. The turntable 3 is rotated continuously by means of a suitable motor 5 (Fig. 2) secured to the base plate by screws 6 (Fig. 3). The motor is provided with a drive pulley 7 in frictional engagement with a wheel 8 which in turn is in frictional engagement with the inner periphery of the rim on the turntable 3. The turntable 3 is rotatably mounted at its center upon a tubular shaft 10. The ballbearing 13 provides a rotatable support for the turntable.

Adjacent the turntable there is provided a pickup arm 17 pivotally mounted for horizontal and vertical movement on the standard 16 (Fig. 2). Pickup arm 17 has a reproducer 18 adapted to track the record 4. Referring in detail to Fig. 5, the pickup arm 17 is pivotally supported in conventional manner as at 15 to an offset bracket 19 that is fixed to the upper end of a vertical sleeve 20 which in turn is journaled in the standard 16. The offset bracket 19 is also provided with an upturned pickup arm rest 21 which acts as a rest for the pickup arm after it is swung beyond the turntable at the completion of playing a stack of records.

Extending through the sleeve 20 is a pickup arm lift pin 23, the lower end thereof being arranged to be moved by one end of a tone arm elevating and lowering lever 30 in which there is provided an adjustable set screw 31. The lever 30 is pivotally mounted as at 32 (Fig. 2) to a bracket 33 depending from the base plate 2. Hence, as the lever 30 is pivoted in a clockwise direction (Figs. 2 and 5), the upper end of the lift pin 23 is moved into engagement with the pickup arm 17 to lift it away from the record 4. Conversely, if the lever 30 is pivoted in a counterclockwise direction, the pickup arm is lowered.

Secured to the lower end of the sleeve 20 (Figs. 4 and 5) is a lever 33 having at the outer end thereof a downwardly extending pin 34 adapted to be moved by a pickup arm control mechanism for swinging the pickup arm horizontally, as hereinafter described.

Referring to Figs. 6 and 7, there is shown in detail, a record-centering spindle 39 for supporting records above the turntable 3 together with means for releasing and lowering a record onto the turntable. The spindle 39 comprises a tubular record-centering sleeve 40 having its upper end extending above the turntable and its lower end affixed to an offset bracket 41 depending from the base plate.

The upper end of the sleeve 40 is beveled internally to form a cam surface at 42 (Fig. 7) for a purpose which will be explained hereinafter. Slidably mounted within the sleeve 40 is a tubular record supporting sleeve 43 having formed at its lower end a shoulder 44 (Fig. 6) which in turn engages and rests on a movable U-shaped bracket 45. Cooperating with the bracket 45 there is pivotally mounted to the bracket 41, as at 46, a lever 47 having an arm 48 which extends into a slot 49 in the side wall of the bracket 45 normally to support the sleeve 43 in the position shown in Fig. 6. The opposite end of the lever 47 is connected to a change-cycle control mechanism which controls the movement of the sleeve 43 as will hereinafter be described.

On the upper end of the sleeve 43 there is provided a plurality of spring extensions 50 which are normally radially displaced and project outwardly beyond the periphery of the sleeve 40 sufficiently to engage the lowermost record of the stack adjacent the wall of the centering aperture of the record. There is also formed on a reduced extension 43′ of the sleeve 43 a shoulder 51 (Fig. 7) projecting above the upper ends of the spring members 50 approximately the thickness of one record and having a diameter slightly less than the centering aperture of a record. As the sleeve 43 is moved in a downward direction, the spring members 50 engage the cam surface 42 (Fig. 7) on the sleeve 40 thereby causing the spring members 50 to be retracted into alignment with the centering apertures of the records 4 to release the lowermost record. When the sleeve 43 is moved again in an upward direction, the spring members 50 again assume their normal position thereby providing a seat for the stack of records to rest on (Fig. 6).

Extending through the sleeve 43 is a control shaft or plunger 52 having its lower end adjustably secured, as at 53 (Fig. 2), to a lever 54 which is pivotably mounted to an offset portion of bracket 41, as at 55.

Formed on the upper end of the control shaft 52 is a head 56 which slidably engages the walls of the bore 57 of a spindle head portion or slotted extension 58 of spindle 39. In turn, head 58 is spaced the thickness of several records above the shoulder 51. Between the head 56 and the bearing surface 59 of the spindle head 58, there is provided a spring 61 which normally biases the shaft 52 in an upward direction. Disposed about the upper end of the extension 43′ of sleeve 43 between the shoulder 51 and the head 58, there is provided an enlargeable resilient record supporting collar 62 having a normal diameter slightly less than the centering aperture of a record. Collar 62 may consist of rubber, for example.

In operation, as the control shaft 52 is moved in a downward direction by the lever 54, the head 56 causes the spring 61 to exert pressure on the bearing surface 59 which in turn causes the head 58 to be moved downwardly thereby causing the collar 62 (Fig. 8) to expand and frictionally grip the aperture walls of at least the record above the lowermost record in the stack. It is to be observed that when the collar 62 is expanded, the lowermost record in the stack freely rests on the extremities of the spring members 50 so that the release of the lowermost record may be effected by the downward movement of the sleeve 43. As the lever 54 releases the control shaft 52, it is caused to be moved in an upward direction by the spring 61 thereby allowing the collar 62 to contract and assume its normal position.

Associated with the shaft 52 and spindle head 58 there is provided means for stabilizing the unplayed record or records upon the spindle. This means (Figs. 6 and 7) consists of a pair of fingers 64 and 65 pivotally mounted as at 66 in the head 58. The free ends of the fingers are arranged to engage the upper surface of the top record in the stack. Each of the fingers is provided with a pair of cam surfaces A and B which are arranged to be engaged by the head 56. Surfaces A and B are arranged on opposite sides of the pivot point 66 and substantially at right angles to the longitudinal axes of each of the fingers 64 and 65. When records are to be placed on the spring members 50, the fingers 64 and 65 are pivoted into the dotted line position (Fig. 7), and are held against downward movement by the head 56 engaging the flat cam surface B. However, during each downward movement of the shaft 52, the fingers 64 and 65 are released for movement. A weight, such as a ball 67, freely disposed within bore 57 in the head 58 causes the fingers to spread and pivot until their free ends engage the upper surface of the records. After each return of the shaft 52 to its normal position (Fig. 7) the head 56 engages the cam surface A and causes the fingers to pivot inwardly towards the records to firmly seat them on the spring members 50.

It is to be noted that the spring members 50 and the stabilizing fingers 64 and 65 permit the removal of records from the turntable without requiring any manipulation of the spindle or the record-supporting mechanism. When it is desired to remove records from the turntable, they are lifted first into contact with the spring members 50 whereupon the spring members are deflected inwardly by the walls of the centering apertures of the records. Secondly, when the walls of the centering apertures are moved into engagement with the fingers 64 and 65, they are caused to be pivoted upwardly and then inwardly to fold within the head portion 58 to allow complete removal of records and, incidentally, placement of new records on members 50.

Figure 4:
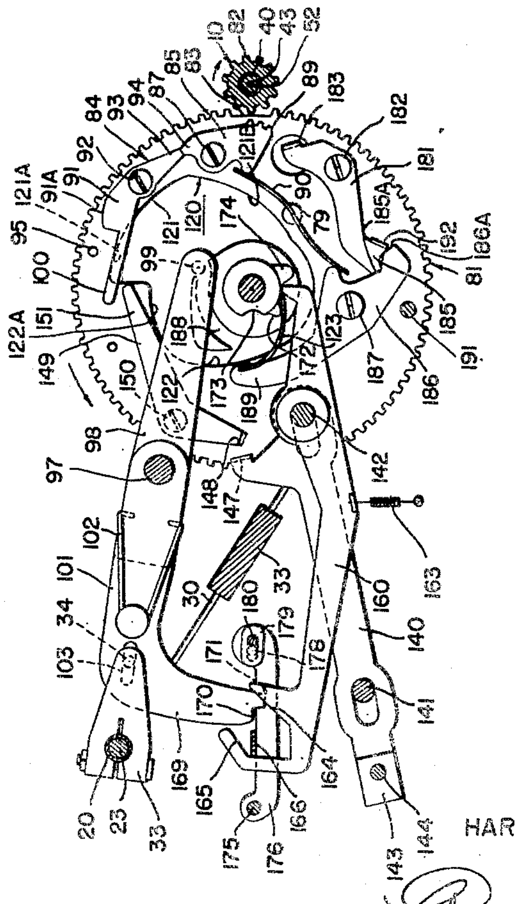
Fig. 4 is a sectional view taken on line 4—4 of Fig. 2 showing the change-cycle control mechanism.

For automatically swinging the tone arm outwardly from the turntable and automatically releasing records from the spindle 39, there is provided a change-cycle control mechanism (Figs. 2, 3 and 4). The control mechanism comprises a unitary cam gear 81 which is adapted to mesh with and be driven by a drive means comprising a pinion gear 82 fixed on the lower end of the turntable shaft 10 (Fig. 2). The teeth of the unitary cam gear comprise a breached portion 83 (Fig. 4), the function of which is to break the driving connection with the pinion gear 82 after one complete revolution of the cam gear thereby to define one complete change-cycle operation.

Arranged on the upper surface of the cam gear 81 is a change-cycle initiating mechanism 84 (Fig. 4) operatively connected and responsive to the abnormal movement of the tone arm when it enters the conventional tripping groove of a record. The mechanism 84 comprises a pawl member 85, pivotally mounted on cam gear 81 by the pin 87, and having a segmental gear 89 for engaging the rotating pinion 82 under the biasing action of a leaf spring 90 which is mounted intermediate its ends on a stud 79. Cooperating with the pawl 85 is a tripping lever 91, pivotally mounted on the cam gear 81 by the pin 92, and having an extension 93 which is arranged to abut the outer extremity of a finger 94 on the pawl 85 for preventing counterclockwise rotation thereof. For limiting the movement of lever 91 there is provided a pin 95 in gear 81. When the tripping lever 91 is operated, as will be described hereinafter, the pawl 85 is pivoted in a counterclockwise direction by the action of spring 90 thereby to engage segmental gear 89 with pinion 82. Finger 94 engages with the side portion of the extension 93 whereupon the lever 91 engages the stop 95 and prevents further movement of pawl 85 with respect to gear 81. This causes the cam gear 81 to be moved in a counterclockwise direction into mesh with the pinion 82 and to be driven through one complete revolution.

For resetting the pawl 85 to terminate rotation of gear 81 and to prepare for a subsequent operation of the gear, there is formed on the lever 91 a cam surface 91A which, during the rotation of the cam gear, engages the pinion 82 and pivots the lever 91 in a counterclockwise direction. As the lever 91 is pivoted, the extension 93 thereof engages the finger 94 on the pawl 85 and pivots it in a clockwise direction until extension 93 and finger 94 abut one another as shown in Fig. 4 whereupon the pawl 85 is reset for a succeeding tripping operation. Also, pawl 85 cannot reengage pinion 82 and therefore gear 81 ceases to rotate when breached portion 83 is moved opposite the pinion.

For tripping lever 91, there is pivotally mounted on a stud 97 depending from the base plate, a lever 98 having affixed at one end thereof a downwardly extending pin 99 which is arranged to engage the arm 100 of the tripping lever 91 and pivot it in a clockwise direction whereby its extension 93 moves out of abutment with finger 94 of pawl 85 and releases the pawl 85 into engagement with the pinion 82. Cooperating with the lever 98 is a lever 101 having one end thereof pivotally mounted about the stud 97. A U-shaped spring 102 affixed to the lever 101 and clipped to the lever 98 causes said levers to pivot together and operate as a single lever under normal conditions. At the opposite end of the lever 101 there is provided an elongated aperture 103 in which is disposed for movement relative thereto the pin 34 connected to the tone arm lever 33. In operation, as the tone arm is normally tracking a record, the pin 34 moves therewith in a clockwise direction thereby pivoting the levers 98 and 101 as a unit in a counterclockwise direction. The pin 99 on the lever 98 approaches the arm 100 of lever 91 until the tone arm enters the tripping groove of the record at which time the pin 99 is moved an abnormal distance and engages arm 100 of the lever 91 to pivot it and release the pawl 85 for engagement with the rotating pinion 82 to start the change-cycle operation.

Figure 10:
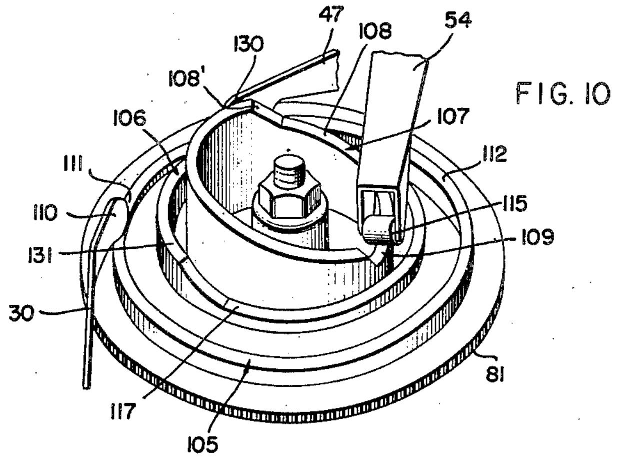
Fig. 10 is a fragmentary perspective view of the underside of the master cam gear which controls the operation of the record-changing mechanism.

For operating the tone arm raising and lowering mechanism and the record-holding and releasing means, there is provided (Figs. 2, 3 and 10) a series of concentric cam surfaces 105, 106 and 107 mounted on the underside of the cam gear 81. Cooperating with the cam 105, there is provided the tone arm lifting and lowering lever 30 having a toe portion 110. The toe 110 normally engages the low portion 111 of cam surface 105. Upon clockwise rotation of the cam gear (Fig. 2), the high portion 112 engages toe 110 and pivots the lever 30 in a clockwise direction (Fig. 2) whereby adjustable screw 31 engages the tone arm elevating pin 23 to lift the tone arm away from the record. When the low portion 111 again engages the toe 110, the lever 30 is pivoted in a counterclockwise direction whereupon the tone arm is lowered onto the record on the turntable.

For operating the resilient record supporting means 62 so that the lowermost record in the stack can be released by the spring 50, there is connected to the lever 54 a roller 115 which is arranged to track the cam surface 107. Normally the roller 115 engages the low portion 109 of cam surface 107 and as the cam gear rotates in a clockwise direction (Fig. 2), the high portion 108 engages and pivots the lever 54 in a counterclockwise direction (Figs. 2 and 6) whereupon the control shaft 52 connected thereto is moved downwardly thereby causing the resilient collar 62 to expand and support all but the lowermost record in the stack above the turntable during the record change-cycle operation. After the lowermost record is released by the spring members 50, the low portion 109 of cam surface 107 engages the roller 115 and the lever 54 is pivoted in a clockwise direction whereupon the contraction of the collar 62 releases the supported records to be again supported by the spring members 50.

While the records are being supported by the resilient collar 62 the toe portion 130 on the lever 47 is normally disposed on the high portion 131 of the cam 106. It is to be observed that the arm 48 (Fig. 6) of the lever 47 engages the bracket 45 within the slot 49 to hold the sleeve 43 against movement when the control shaft 52 is moved in a downward direction by the cam 107 to expand the resilient collar 62. As the cam gear rotates in a clockwise direction (Figs. 2 and 10), the low cam surface 117 causes the lever 47 to pivot in a counterclockwise direction (Fig. 6) whereupon the sleeve 43 is released to move in a downward direction to cause the spring members 50 to engage the upper end of the sleeve 40 and retract to thereby release the lowermost supported record to the turntable. Simultaneously, with the engagement of lever 47 with portion 117 of cam 106, lever 54 engages portion 108′ of cam 107 and, through shaft 52 and its head portion 56, draws record supporting sleeve 43 downwardly until springs 50 assume the position shown in Fig. 8. Thus, the lowermost record is released, but head 56 compresses spring 61 to hold collar 62 in compression thereby to grasp all of the records except the lowermost record. When the high cam surface again engages the lever 47, it is moved upwardly to release the spring members 50 and support the records held by the resilient collar 62.

For swinging the pickup arm away from the turntable during a record-changing cycle and returning it over the starting groove of a record for a reproduction cycle, there is formed on the upper surface of the cam gear 80, a cam track 120 (Fig. 4) adapted to cooperate with the lever 98 and pin 99, fixed therein. When the levers 98 and 101 have tripped the lever 91, in a manner already described, to start the change-cycle operation, there is arranged on the cam track 120 a cam surface 121 which engages the pin 99 and causes the levers 98 and 101 to pivot in a clockwise direction (Fig. 4). As a result, the wall in the elongated aperture 103 on the opposite end of the lever 101 causes the pin 34 of the pickup arm lever 34 to pivot it and the pickup arm in a counterclockwise direction away from the turntable.

Formed on the cam track 120 is another cam surface 122 which is designed to temporarily hold the pickup arm away from the turntable during the record releasing operation of the spindle 39. A spring 123, affixed to the hub of the cam gear, is provided for normally urging pin 99 into contact with surface 122 for reasons which will become clear in subsequent description.

Reject means are provided for initiating the change-cycle operation prior to the completion of the reproduction of a record. This means comprises a lever 140 (Figs. 2 and 4) slidably mounted on studs 141 and 142 depending from the base plate. At one end of the lever 140 there is arranged a down turned cam surface 143 which is adapted to be engaged by the lower end of a control rod 144 (Fig. 2), journaled in the standard 16. The opposite end of the control rod is provided with an operating knob 146. On the opposite end of the lever 140 there is provided an offset down turned ear 147 (Fig. 4) which is arranged to engage an upturned ear 148 on a lever 149 pivotally mounted as at 150 on the cam gear 81. The lever 149 includes an arm 151 adapted to engage the arm 100 of the change-cycle initiating lever 91. When the control rod 144 is depressed, the lower end thereof engages the down turned cam surface 143 and moves the lever 140 to the right against the biasing action of the spring 152 connected between the stud 141 and the lever 140. When the lever 140 is moved to the right, the ear 147 thereof engages the upturned ear 148 on the lever 149 and pivots it in a counterclockwise direction, whereupon the arm 151 thereof engages the tripping lever 91 to start the record change-cycle operation. The spring 152 returns the lever 140 and the rod 144 to their normal position when control rod 144 is released.

Figure 9:
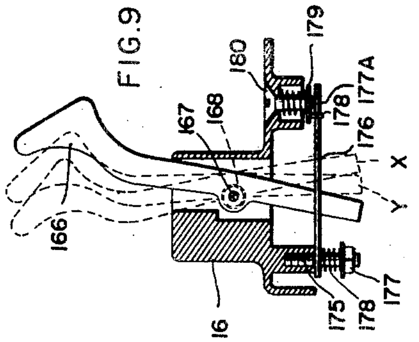
Fig. 9 is a sectional view taken on line 9—9 of Fig. 1 showing the record-indexing mechanism.

Associated with the pick-up arm levers 98 and 101 there is provided a mechanism for returning the pickup arm over the starting groove of a small or large record, for example, a ten-inch or a twelve-inch record. This mechanism comprises a lever 160 (Fig. 4) pivotally mounted intermediate its ends on the stud 142. One end of the lever 160 is biased against the hub of the cam gear by a spring 163 secured to the base plate in any suitable manner. Upon rotation of the cam gear, the lever 160 is arranged to be actuated by cam surfaces 172, 173 and 174 formed on the hub of the cam gear. On the opposite end of the lever 160 there is provided a pair of spaced offset cam surfaces 164 and 165 which are adapted to engage and actuate the lower end of a record-indexing lever 166 (Figs. 4 and 9) pivotally mounted intermediate its ends by a pin 167 in the standard 16. A spring 168 is provided for frictionally engaging the lever 166 against the wall of the standard 16. The upper end of the lever 166 is arranged in the path of fall of the large records so as to be engaged and pivoted in a counterclockwise direction when a twelve-inch record is dropped from the spindle and, incidentally, when a twelve-inch record is removed from the turntable. Cooperating with the indexing lever 166 is an arm 169 of the pickup arm lever 101. On the outer end of the arm 169 there is provided a pair of stop surfaces 170 and 171 which are adapted, when the pickup arm is swung inwardly, to engage the indexing lever 166 and stop the pickup arm over the starting groove of either a small or a large record respectively.

Normally, as will be evident later in the description, the lower end of lever 166 is pivoted to the full line position (Figs. 4 and 9) to permit the movement of the arm 169 under the control of the pickup arm as it tracks the playing groove of a record during a playing cycle. During a change-cycle the counterclockwise rotation of the cam gear (Fig. 4) causes the cam surface 172 thereof initially to engage the lever 160 and pivot it in a clockwise direction. When the lever 160 is so pivoted, it normally has no effect. However, in the event that one or more large, or twelve-inch, records have been removed from the turntable previous to the start of the change-cycle, index lever 166 would have been moved from the full line position to the dotted line "X" position. In this case the initial movement of lever 160 causes its surface 164 to contact the lower end of lever 166 and move it only to the dotted line "Y" position shown in Figs. 4 and 9. On the other hand, if records were not previously removed and lever 166 is in the fall line position further rotation of the cam gear causes the cam surface 173 to engage lever 160 and pivot it in a counterclockwise direction, whereupon the cam surface 165 of lever 160 contacts the lower end of lever 166 and moves it to the dotted line "Y" position. Thus, cam surfaces 172 and 173 serve to position lever 166 in the "Y" position, regardless of what has previously occurred. If a small record drops to the turntable during the change-cycle, it does not contact lever 166 and therefore this lever remains in the dotted line "Y" position. In this position of lever 166, the movement of pickup arm control lever 169 is interrupted when stop surface 170 contacts lever 166. This movement is interrupted at the time that the pickup arm is over the starting groove of a small or ten-inch record.

Upon further rotation of the cam gear, the cam surface 174 thereof engages the lever 160 to pivot it in a clockwise direction whereupon cam surface 164 engages lever 166 and resets it from the dotted line "Y" position to the full line position to permit the movement of arm 169 while the pickup arm is tracking a record during the playing cycle. It is to be noted that cam surface 174 moves lever 160 through a greater angle than is the case with cam surface 172.

When a large or twelve-inch record is dropped from the spindle, it contacts the indexing lever 166 to move it in a counterclockwise direction whereupon the lower end thereof is moved to the dotted line "X" position. However, the record is not dropped until after cam surface 173 has contacted lever 160 and therefore lever 166 remains in the dotted line "X" position until arm 169 moves toward lever 166 and the projection 171 contacts lever 166. At this time the pickup arm is positioned over the starting groove of a large or twelve-inch record. As stated hereinbefore in connection with the dropping of a ten-inch record, cam 174 subsequently contacts lever 160 and moves cam surface 164 into contact with lever 166 to reset it to the full line position, thereby permitting movement of arm 169 while the pickup arm is tracking the playing groove of the record.

Associated with the indexing lever 166, there is provided means for accurately adjusting the position of the pickup arm with respect to the starting groove of a record. This means comprises a lever 176 (Fig. 4) pivotally mounted at one end thereof about a threaded pin 175 secured to the base plate. A nut 177 (Fig. 9) and spring 178 frictionally engage the lever 176 with the base plate. On the opposite end of the lever 176 there is arranged an elongated slot 177 in which is positioned for movement a pin 178 eccentrically mounted on a collar 179. The collar 179 is in turn affixed to a spring-biased screw 180 which is journaled in the base plate. The lever 176 is positioned for movement against the lower end of the indexing lever 166. In operation, upon slight rotation of the screw 180 in either direction, the lever 176 is moved to adjust the lever 166 in a horizontal plane to such a position as to cause the arm 169 to engage it at the proper point to place the pickup arm accurately over the starting groove of a record.

Means are provided for automatically swinging the pickup arm away from the turntable after the completion of playing all the records in the stack so that the records may be removed from the turntable. This means comprises a lever 181 (Fig. 4) pivotally mounted on the cam gear by a pin 182. The lever 181 has a downturned ear 183 which projects below the plane of the cam gear and is arranged to be intercepted, at the completion of playing the stack of records, by an upturned ear 184 on the bracket 45 (Fig. 6).

When records are placed on the spindle, their weight causes the shoulder 44 of the sleeve 43 to move the bracket 45 a slight distance downwardly with respect to lever arm 48 against the biasing action of a light spring 190 affixed to the bracket 45 and bearing on the arm 48. It is to be observed that the arm 48 extending in the slot 49 now supports the bracket 45. When the bracket 45 is in this position, the upturned ear 184 thereof is positioned out of the path of movement of the ear 183 of lever 181 when the cam gear rotates during a normal change-cycle operation. However, when the last record has been dropped from the spindle, the spring 190 lifts the bracket 45 with respect to lever arm 48 and causes the ear 184 thereof to be positioned in the path of movement of the ear 183 when the cam gear operates again thereby to impart movement to lever 181.

On the opposite end of the lever 181, there is provided an arm 185 against which is biased, by the spring 90, one end of a lever 186 pivotally mounted on pin 187 in gear 81. During the rotation of the cam gear, when the ear 184 intercepts the ear 183 on the lever 181, it is pivoted in a counterclockwise direction, whereupon the arm 185 thereof cams the lever 186 against the action of spring 90 in a clockwise direction. Levers 181 and 186 are moved until surfaces 185A and 186A abut one another and the extension 189 thereof is moved over the cam track 122 to cause the pin 99 on the arm 98 to follow the cam track 188. As the pin 99 is tracking the cam track 188, the spring 123, which normally guides the pin 99 to the cam surface 122, is deflected about the cam gear hub. Shortly after the pin 99 enters the cam track 188, the spring is released. When the pin 99 tracks the cam track 188, the pickup arm is swung outwardly instead of inwardly as it would be if pin 99 was tracking cam track 122. Simultaneously, when the pin 99 leaves the cam track 188, the breached portion 83 on the cam gear reaches the pinion 82 to break the driving connection, whereupon the change-cycle operation stops with the pickup arm positioned clear of the turntable periphery.

Means are provided for resetting the levers 181 and 186 so that the motion of the pickup arm will be normal for the next change-cycle. Depending from the base plate there is arranged a pin 191 which, during the rotation of the cam gear, intercepts an upturned ear 192 on the arm 185 of the lever 181. When the pin 191 intercepts the ear 192, the lever 181 is pivoted in a clockwise direction to cause the arm 185 thereof and the lever 186 to unlock and move in a counterclockwise direction, aided by the biasing action of spring 90. Thus, levers 181 and 186 are reset to the position shown in Fig. 4.

In describing the operation, it will be assumed that a stack of intermixed large and small records is placed on the spring members 50 of the spindle 39. The reject control knob 146 is depressed whereupon the lever 140, operatively connected thereto, is moved to the right (Fig. 4). As the lever 140 is moved to the right, the upturned ear 147 thereof engages the ear 148 on the lever 149 and pivots it in a counterclockwise direction to engage its arm 151 with arm 100 of the tripping lever 91 to pivot it in a clockwise direction. As the lever 91 is pivoted, its extension 93 releases the pawl 85 from its engagement therewith. Under the biasing action of spring 90, pawl 85 is pivoted in a counterclockwise direction, whereby its segmental gear 89 engages the rotating pinion 82. When the segment gear engages the pinion 82, the cam gear 81 is moved into mesh with the pinion 82 and rotated.

As the cam gear rotates, the high cam surface 112 of cam 105 (Fig. 2) engages the toe 110 (Fig. 2) of the pickup arm lifting and lowering lever 30 to pivot it in a clockwise direction whereupon the opposite end thereof engages and raises the pin 23 to lift the pickup arm off the pickup arm rest 21.

With the raising of the pickup arm, the high portion 108 of cam 107 engages the roller 115 on the lever 54 and pivots it in a counterclockwise direction (Fig. 2) whereupon the control shaft 52 operatively connected thereto, is urged downwardly thereby moving the spindle head 58 downwardly to cause the resilient collar 62 to expand and support all but the lowermost record in the stack. The lowermost record is freely disposed about the shoulder 51 and supported by the spring members 50 on the sleeve 43.

It has been assumed that the pickup arm was at rest on rest 21, in which case pin 99 would be in the position shown in Fig. 4. Accordingly, the initial rotation of gear 81 would not effect any horizontal movement of the pickup arm. If, however, the change-cycle followed the playing of a record, pin 99 would have been moved by the pickup arm to a position adjacent surface 121A of cam surface 120. Then, as the collar 62 is being expanded and the cam gear continues to rotate, the cam surface 121 of cam track 120 engages pin 99 on the lever 98 (Fig. 4). Further rotation of the cam gear engages surface 121B with pin 99 to pivot lever 98 in a clockwise direction. As the lever 98 is pivoted, the pickup arm operatively connected thereto is pivoted in a counterclockwise direction beyond the edge of the turntable to permit the dropping of a record from the spindle.

Just before the collar 62 is fully expanded, the toe 130 of the lever 47 is engaged by the low cam surface 117 whereupon the lever 47 is caused to pivot in a clockwise direction (Fig. 2). As the lever 47 is pivoted, the arm 48 thereof permits the downward movement of the bracket 45 on which rests the sleeve 43. At this time roller 115 engages portion 108′ of cam surface 107 thereby to impart further downward movement to shaft 52. Since both levers 47 and 54 are pivoted downwardly substantially simultaneously by the cam portions 117 and 108′ respectively, the sleeve 43 and the shaft 52 are moved downwardly simultaneously. As the sleeve 43 is moved downwardly, the spring members 50 connected thereto engage the surface 42 of the sleeve 40, whereupon they are caused to retract into alignment with the centering aperture of the lowermost supported record and release this record to drop onto the turntable. Meanwhile, collar 62 is retained in expanded condition by the continued downward movement of shaft 52, thereby to support all but the lowermost record.

Before the pickup arm is returned to a position over the record, an adjustment is made for positioning the pickup arm over the initial playing groove of the record which has been dropped, whether this record is large or small. Accordingly, as the pickup arm is being moved outwardly, the lever 160 is engaged by the cam surface 172 on cam gear 81 and pivoted in a clockwise direction, whereupon the cam surface 164 thereof may engage and move the lever 166 from the dotted line "X" position to the dotted line "Y" position. It is to be noted that the only time that the lever 166 is in the dotted line "X" position is after a twelve-inch record has been removed from the turntable or after a twelve-inch record has been dropped from the spindle. Further rotation of the cam gear causes the cam surface 173 thereof to pivot the lever 160 in a counterclockwise direction, whereupon the cam surface 165 thereof is moved, either to move lever 166 to position "Y," or to check or assure that the lever 166 is in the dotted line "Y" position. The dotted line "Y" position acts as a stop for the ten-inch projection 170 on the pickup arm lever 101. If a ten-inch record is released from the spindle, the upper end of the indexing arm 166 is so positioned that it is not engaged by it. Therefore, when the pickup arm is returned toward the turntable, the projection 170 on the arm 169 engages the lever 166 to position the pickup arm over the starting groove of a ten-inch record. However, if a twelve-inch record is dropped, the upper end of the lever 166 is engaged by the record and caused to pivot in a counterclockwise direction, whereupon its lower end is moved to the dotted line "X" position. When the pickup arm is returned towards the turntable, the projection 171 on the arm 169 engages the lever 166 to stop the pickup arm over the starting groove of a twelve-inch record.

Meanwhile, continued rotation of the cam gear causes the spring 123 thereof to engage the pin 99 of the pickup arm control lever 98 and guide it into engagement with the cam surface 122 to swing the pickup arm inwardly toward the record on the turntable. Subsequently, surface 122 moves the pickup arm until either stop surface 170 or stop surface 171 engages lever 166.

After the record has been dropped onto the turntable and the pickup arm positioned over the starting groove of a record, the cam gear continues to rotate and the low cam surface 109 on cam 107 engages and pivots the lever 54 in a clockwise direction (Fig. 2) to release shaft 52 and allow the resilient collar 62 to contract to its normal non-record-holding position. As the cam surface 109 is pivoting the lever 54 to release the shaft 52, the high cam surface 131 engages the lever 47 and pivots it whereby its arm 48 lifts the bracket 45 to return the sleeve 43 to its normal position. Spring members 50 move outwardly to the record supporting position, so that, as the lever 54 reaches the low cam surface 109, the resilient collar 62 releases the records onto the spring members 50.

Meanwhile, continued rotation of the cam gear causes the low cam surface 111 to engage the lever 30 to pivot it in a counterclockwise direction to lower the pickup arm onto the released record. Also, cam surface 174 engages lever 160 to reset lever 166 to the full line position.

The change-cycle is terminated when breached portion 83 of cam gear 81 reaches the position shown in Fig. 4. During the early part of the change-cycle, the cam gear causes the cam surface 91A to engage the pinion 82 and pivot the lever 91 in a counterclockwise direction. As the lever 91 is pivoted, the extension 93 thereof engages the finger 94 on the pawl 85 and pivots it in a clockwise direction until extension 93 and finger 94 abut one another, whereupon the pawl 85 is reset for a repeated operation. After the pawl 85 is reset, the cam gear continues to rotate until the breached portion 83 is opposite the pinion 82 whereupon the driving connection therewith is broken, thereby completing the record change-cycle operation.

When all of the records have been played, the spring 190, affixed to the bracket 45, and the arm 48 causes the bracket to be lifted, with respect to lever 47, thereby to position the ear 184 thereof in the path of movement of the ear 183 on the lever 181. When the pickup arm enters the tripping groove of the last played record, the change-cycle operation is repeated in the manner already described. However, as the cam gear rotates, the ear 184 intercepts the lever 181 and it is pivoted in a counterclockwise direction, whereupon the arm 185 causes the lever 186 to move its extension 189 over the track 122 to cause the pin 99 on arm 98 to follow the cam 188 and swing the pickup arm outwardly beyond the periphery of a record on the turntable. Thus, pin 99 is positioned as illustrated in Fig. 4, instead of being adjacent surface 122A, whereby the pickup arm is not returned to its usual position over the record.

From the description, it will be evident that there is provided, in accordance with this invention, an automatic phonograph mechanism having numerous advantages over the mechanisms of the prior art. A novel spindle is presented which is adapted to support and release records with minimum damage to the records at their centering apertures. The structure of the spindle is simplified so that it is economical to manufacture.

The invention also presents a stabilizing mechanism which is especially adapted to prevent the records from tilting while they are supported entirely at their centering apertures. This serves to prevent any interference between the records and the pickup arm during a record changing cycle. It is also to be noted that the structure of the stabilizing device is such that records may readily be threaded onto the spindle or removed therefrom.

Still another advantage of this invention resides in the structure provided for automatically moving and holding the pickup arm beyond the peripheries of the records on the turntable after the last record has been played. This feature saves the mechanism from damage resulting from improper handling of the pickup arm and it also reduces the manual manipulation required for operating the device.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A record supporting and dropping structure comprising a record centering spindle, a record support incorporated in said spindle, a stabilizing device pivoted in said spindle and movable from a retracted position in alignment with said spindle to an extended position into contact with the top surface of the uppermost record threaded on said spindle, a movable member associated with said spindle and having a single contact surface for cooperating with said stabilizing device, said member being movable to bring said contact surface into engagement with said stabilizing device for moving it into said retracted position or said extended position and a gravity controlled device operatively associated with said stabilizing device for influencing said stabilizing device to an extended position.

2. A record supporting and dropping structure comprising a record centering spindle, a record support incorporated in said spindle, a stabilizing device pivoted in said spindle and movable from a retracted position in alignment with said spindle to an extended position into contact with the upper flat surface of the uppermost record threaded on said spindle, said device including a pair of cam surfaces adjacent the pivot, a plunger associated with said spindle and having a single surface movable into the paths of movement of said cam surfaces for engaging them and biasing said stabilizing device into said retracted position or said extended position and a gravity controlled device operatively associated with said stabilizing device for influencing said stabilizing device to an extended position.

3. A record supporting and droppnig structure comprising a record centering spindle device, a record supporting device disposed at the upper end of said spindle remote from the turntable, an extension connected to said spindle and disposed above said record supporting device for centering records above said spindle, a device for stabilizing the records horizontally pivoted in said extension and movable from a retracted position in alignment with said extension through an obtuse angle to an extended position into contact with the upper flat surface of the uppermost record threaded on said extension, said device including a pair of cam surfaces adjacent the pivoted end thereof, a plunger projecting out of said spindle and having a surface movable into the paths of movement of said cam surfaces for engaging them and biasing said stabilizing device into said retracted position or said extended position and a gravity controlled device operatively associated with said stabilizing device for influencing said stabilizing device to an extended position.

4. A record supporting and dropping structure comprising a record centering spindle device, a record supporting device disposed at the upper end of said spindle, an extension connected to said spindle and disposed above said record supporting device for centering records above said spindle, a pair of fingers pivoted at one end thereof in said extension and movable in opposite directions from a retracted position in alignment with said extension to an extended position wherein the free ends of said fingers contact the uppermost record threaded on said extension, each of said fingers including a pair of cam surfaces situated on opposite sides of the pivot point and disposed substantially at right angles to the longitudinal axis of said fingers, a plunger projecting out of said spindle into the paths of movement of said cam surfaces for engaging them and biasing said fingers into said retracted position or said extended position and a gravity controlled element operatively associated with said fingers for influencing said fingers to an extended position.

5. A record supporting and dropping structure comprising a record centering spindle device, a record supporting device disposed at the upper end of said spindle, an extension connected to said spindle and disposed above said record supporting device for centering records above said spindle, a pair of fingers pivoted at one end thereof in said extension and movable in opposite directions from a retracted position in alignment with said extension to an extended position wherein the free ends of said fingers contact the uppermost record threaded on said extension, each of said fingers including a pair of cam surfaces situated on opposite sides of the pivot point and disposed substantially at right angles to the longitudinal axis of said fingers, a plunger projecting out of said spindle into the paths of movement of said cam surfaces for engaging them and biasing said fingers into said retracted position or said extended position and a freely movable gravity controlled element operatively associated with said fingers for influencing said fingers to an extended position.

6. A record supporting and dropping structure comprising a record centering spindle device, a record supporting device disposed at the upper end of said spindle, an extension connected to said spindle and disposed above said record supporting device for centering records above said spindle, a pair of fingers pivoted at one end thereof in said extension and movable in opposite directions from a retracted position in alignment with said extension to an extended position wherein the free ends of said fingers contact the uppermost record threaded on said extension, each of said fingers including a pair of cam surfaces situated on opposite sides of the pivot point and disposed substantially at right angles to the longitudinal axis of said fingers, a spring biased plunger projecting out of said spindle into the paths of movement of said cam surfaces for engaging them and biasing said fingers into said retracted position or said extended position and a freely movable ball shaped weight disposed within said extension and between said fingers for influencing said fingers to an extended position.

7. A record supporting and dropping structure comprising a record centering spindle device, a record supporting device disposed at the upper end of said spindle, a slotted extension connected to said spindle and disposed above said record supporting device for centering records above said spindle, a pair of fingers pivoted at one end thereof in said slot and movable in opposite directions from a retracted position within said slot to an extended position wherein the free ends of said fingers contact the uppermost record threaded on said extension, each of said fingers including a pair of cam surfaces situated on opposite sides of the pivot point and disposed substantially at right angles to the longitudinal axis of said fingers, a spring biased plunger projecting out of said spindle into the paths of movement of said cam surfaces for engaging them and biasing said fingers into said retracted position or said extended position and a freely movable ball shaped weight disposed within said slotted extension and between said fingers for influencing said fingers to an extended position.

8. In an automatic record changer, a turntable, a record supporting spindle comprising a tubular record centering member extending upwardly from said turntable, a record supporting member movable within said record centering member, movable members fixed to said record supporting member and radially displaced above the end of said record centering member and beyond the periphery thereof for supporting records, a record engaging member on said record supporting member and spaced from said movable members a distance equivalent to the thickness of a record, a shaft including a portion in operative relation with said record engaging member for moving said record engaging member into engagement with all but the lowermost of said records, and change-cycle controlling means for operating said shaft and subsequently to operate independently of said shaft said movable members for releasing a record.

9. In an automatic record changer, a turntable, a record supporting spindle comprising a tubular record centering member extending upwardly from said turntable, a record supporting member within said record centering member, movable members fixed to said record supporting member and radially displaced above the end of said record centering member and beyond the periphery thereof for supporting records, a record engaging member on said record supporting member and spaced from said movable members a distance equivalent to the thickness of a record, a head for said spindle mounted in contact with said record engaging member, a shaft including a head in operative relation with said spindle head, means disposed between said shaft head and said spindle head for engaging said spindle head with said record engaging member and moving said record engaging member into engagement with all but the lowermost of said records, and change-cycle controlling means for moving said shaft for moving said record engaging member and subsequently to move independently of said shaft said record supporting member for drawing said movable members into alignment with said record centering member.

10. In an automatic record changer, a turntable, a record supporting spindle comprising a tubular record centering member extending upwardly from said turntable, a record supporting member within said record centering member, resilient members fixed to said record supporting member and radially displaced above the end of said record centering member and beyond the periphery thereof for supporting records, a shoulder on said record supporting member extending beyond the extremities of said resilient members a distance equivalent to the thickness of a record, an extension on said record supporting member extending from said shoulder, a resilient record engaging member disposed on said shoulder about said extension, a head for said spindle mounted on said extension in contact with said record engaging member, a shaft including a head disposed within said spindle head, means disposed between said shaft head and said spindle head for engaging said spindle head with said record engaging member and expanding said record engaging member into engagement with all but the lowermost of said records, a lever engaging said shaft, another lever engaging said record supporting member and change-cycle controlling means for operating said levers to move said shaft for compressing and expanding said record engaging member and subsequently to move said record supporting member for drawing said resilient members within said record centering member.

11. In an automatic record changer, a turntable, a record supporting spindle comprising a tubular record centering member extending upwardly from said turntable, a record supporting member within said record centering member, resilient members fixed to said record supporting member and radially displaced above the end of said record centering member and beyond the periphery thereof for supporting records, an extension on said record supporting member extending beyond the extremities of said resilient members and including a shoulder extending beyond said extremities a distance equivalent to the thickness of a record, a resilient record engaging member disposed on said shoulder about said extension, a head for said spindle mounted on said extension in contact with said record engaging member, a shaft extending through said record supporting member including a head disposed within said spindle head, spring means disposed between said shaft head and said spindle head for engaging said spindle head with said record engaging member and expanding said record engaging member into engagement with all but the lowermost of said records, a lever engaging said shaft, another lever engaging said record supporting member and change-cycle controlling means for operating said levers to move said shaft for compressing and expanding said record engaging member and subsequently to move said record supporting member for drawing said resilient members within said record centering member.

12. In an automatic record changer, a turntable, a record supporting spindle comprising a tubular record centering member extending upwardly from said turntable, a tubular record supporting member within said record centering member, spring extensions fixed to said record supporting member and radially displaced above the end of said record centering member and beyond the periphery thereof for supporting records, an extension on said record supporting member extending beyond the extremities of said spring extensions and including a shoulder extending beyond said extremities a distance equivalent to the thickness of a record, a resilient record engaging collar disposed on said shoulder about said extension, a head for said spindle freely mounted on said extension in contact with said collar, a shaft extending through said record supporting member including a head disposed within said spindle head, spring means disposed between said shaft head and said spindle head for engaging said spindle head with said collar and expanding said collar into engagement with all but the lowermost of said records, a first lever engaging said shaft, another lever engaging said record supporting member and change-cycle controlling means including a cam for operating said first lever to move said shaft for compressing and expanding said collar and a cam subsequently operable to move said record supporting member for drawing said spring extensions within said record centering member during movement of said shaft.

13. A record supporting structure comprising a record centering spindle having a record support and a pair of stabilizing levers pivoted to said spindle at a point above said record support and movable from a retracted position in alignment with said spindle to an extended position in contact with the top surface of the uppermost record on said spindle, and a plunger within said spindle having one end in contact with the ends of said levers that are adjacent said spindle and a spring for pressing said plunger against said ends of said levers to hold the other ends thereof in the extended position against the upper surface of a record positioned on said record support.

HARVEY C. HABEGGER.

References Cited in the file of this patent

UNITED STATES PATENTS

| Number | Name | Date |
|---|---|---|
| 1,438,000 | Underhill | Dec. 5, 1922 |
| 1,931,487 | Collison et al. | Oct. 24, 1933 |
| 1,970,691 | Collison et al. | Aug. 21, 1934 |
| 2,287,098 | Habegger | June 23, 1942 |
| 2,293,703 | Becwar | Aug. 25, 1942 |
| 2,295,092 | Offen | Sept. 8, 1942 |
| 2,309,197 | Lewis | Jan. 26, 1943 |
| 2,355,790 | Faulkner | Aug. 15, 1944 |
| 2,374,080 | Dale | Apr. 17, 1945 |
| 2,376,741 | Weaver | May 22, 1945 |
| 2,457,106 | Pressley | Dec. 21, 1948 |
| 2,545,847 | Guedon | Mar. 20, 1951 |
| 2,555,478 | Emde et al. | June 5, 1951 |
| 2,565,413 | Wahtera et al. | Aug. 21, 1951 |
| 2,568,716 | Bugg | Sept. 25, 1951 |
| 2,576,125 | Lapish | Nov. 27, 1951 |

FOREIGN PATENTS

| Number | Country | Date |
|---|---|---|
| 822,026 | France | Sept. 6, 1937 |
| 68,662 | Norway | Dec. 4, 1944 |
| 896,091 | France | Feb. 12, 1945 |
| 69,274 | Norway | May 28, 1945 |